Nov. 8, 1966 W. N. KING ET AL 3,284,560
METHOD OF MAKING PLASTIC TUBES
Original Filed Sept. 18, 1963 4 Sheets-Sheet 1
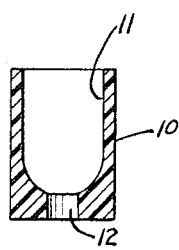
FIG. 1
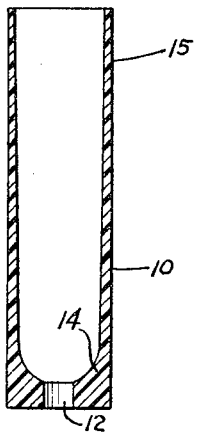
FIG. 2
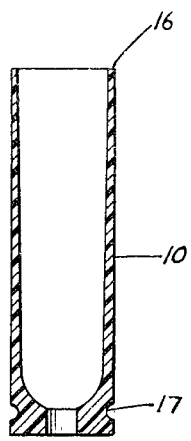
FIG. 3
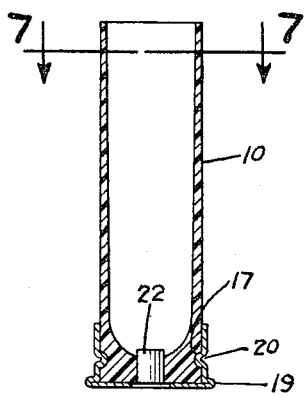
FIG. 4
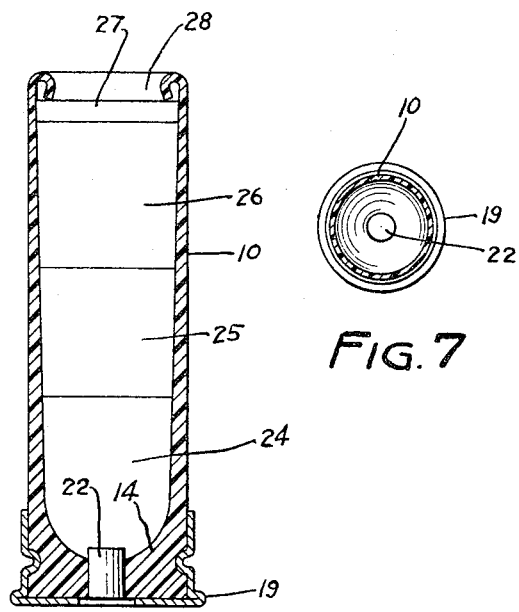
FIG. 6
FIG. 7
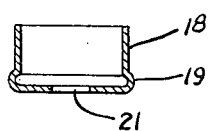
FIG. 5
INVENTORS
WILLIAM N. KING
BY EDWARD E. MERRITT
Moore, White & Burd
ATTORNEYS Nov. 8, 1966  W. N. KING ET AL  3,284,560
METHOD OF MAKING PLASTIC TUBES
Original Filed Sept. 18, 1963  4 Sheets-Sheet 2
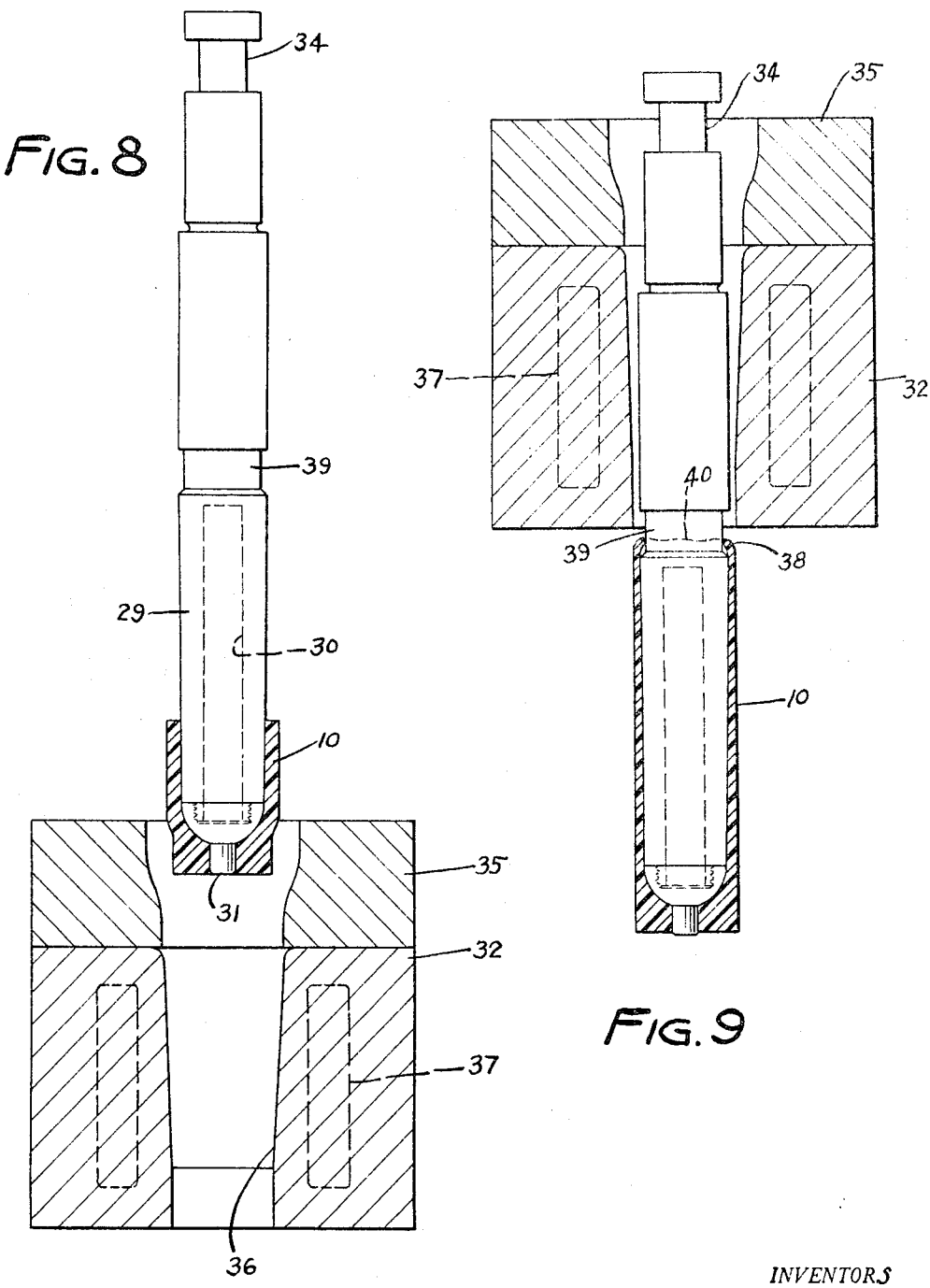
INVENTORS
WILLIAM N. KING
BY EDWARD E. MERRITT
Moore, White & Burd
ATTORNEYS

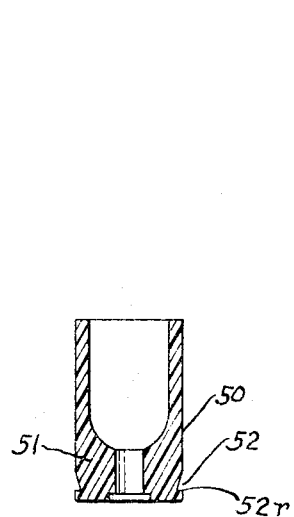
FIG.10
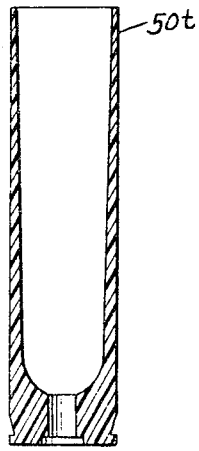
FIG.11
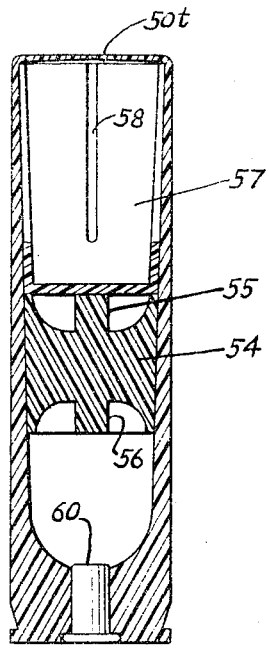
FIG.12
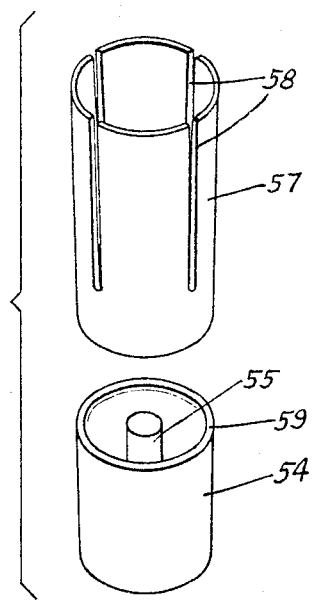
FIG.14
FIG.13
INVENTORS
WILLIAM N. KING
BY EDWARD E. MERRITT
ATTORNEYS Nov. 8, 1966  W. N. KING ET AL  3,284,560
METHOD OF MAKING PLASTIC TUBES
Original Filed Sept. 18, 1963  4 Sheets-Sheet 4

INVENTORS
WILLIAM N. KING
BY EDWARD E. MERRITT
Moore, White & Burd
ATTORNEYS 3,284,560
METHOD OF MAKING PLASTIC TUBES
William N. King and Edward E. Merritt, Anoka, Minn., assignors to Federal Cartridge Corporation, Minneapolis, Minn., a corporation of Minnesota
Original application Sept. 18, 1963, Ser. No. 309,824. Divided and this application Oct. 19, 1964, Ser. No. 404,662
4 Claims. (Cl. 264—292)

This application is a division of our continuation-in-part application Serial No. 309,824, filed September 18, 1963, now abandoned which was copending with our application U.S. Serial No. 132,742, filed August 14, 1961, for Plastic Shot Shell Case and Method (now abandoned).

This invention is a novel method of making plastic tubes of limited length and at least partially closed at one end shot shell cases that incorporates the tube of the device such as a shell case and the partially closed end such as the base wad in an integral plastic unit, the tube of which is drawn or stretched precisely in two directions to strengthen it while controlling wall thickness within tolerances necessary for it to serve its purpose.

While making the tubes of plastic as described above and hence suitable for shot shells has long been a dream of manufacturers, it is only recently that the technique for making plastic tubing that was strong enough to make good shot shell cases became a reality. Even in those cases where the tubes of shot shells are made of this strengthened plastic, they are still tubular in form and thereby continue to have one of the principal drawbacks of the old paper tube shot shells. Any shot shell that uses a tube open at both ends requires a conventional base wad and will have difficulty with gas leakage through or past the base wad. The base wads, which surround the priming cap in shot shells and theoretically seal the gases formed by the burning powder in them, have taken countless forms. Regardless of the manner in which they are made, however, they are invariably subject to a certain amount of gas leakage from the high pressures generated when the shell is fired. Any shell employing a conventional base wad structure of the rolled paper type or any type of material that is formed of pieces rolled or pressed together will unravel or confetti in due time. Confettiing is a colloquialism used in the trade to describe the tendency of base wad to tear apart into tiny little pieces comparable to confetti. This material may be carried into the barrel of a gun and must be cleaned out regularly. Whenever there is any unravelling, confettiing or other distortion of the base wad, gas leakage is possible.

Also, shells made with a plastic tube substituted for a paper tube but otherwise constructed in substantially the same manner as paper shell tubes require nearly as many steps to make, as do the paper shell tubes. Hence, shot shells made with open ended plastic tubes substituted for paper ones are nearly as expensive to manufacture as paper tube shells.

Yet another problem facing the manufacturer of the modern day shell is the fact that as the loads get heavier and the charge is made bigger in order to drive the loads with killing power for longer distances, the pressures generated against the attachment of the metal head to the tube become greater. In any shot shell, except one constructed as disclosed herein, the head must resist this pressure in part, since the head essentially closes the end of the tube and provides the support for the base wad. Hence, the greater force generated by the shell, the greater the strain placed on the connection between the tube and the head. For this reason, conventional heads generally are of substantial strength and length in order to provide a good bond between the head and the tube.

It is true that it has been proposed heretofore to have biaxially oriented plastic shot shell tubes, but as far as is known they are used only to replace paper tubes. Accordingly they employ conventional base wad construction. In the alternative, it has been proposed to mold plastic shells with an integral base wad and tube but without offering any method or means or even suggesting biaxially orienting the tube of an integrally molded shell tube and base wad after the molding is done. The prior art teachings have been available to inventors for some time without anyone else proposing that they be combined into a single shell such as that disclosed here. Hence the present structure is the first offering of this combination of structures which represents a tremendous advance over previously available shells.

Accordingly, it is an object of this invention to provide a method of making novel plastic tubes.

It is another object of this invention to provide a plastic tube in which the tube is biaxially stretched and an integral section of the tube at least partially closes the end.

It is a further object of this invention to provide a novel method of making a shot shell tube in which substantially none of the force generated in firing the shell is applied to the metal head thereof.

It is a still further object of this invention to provide a method of making plastic tube shot shells in which the stretch applied to the plastic tube is well controlled.

Yet another object of this invention is to provide a method of making thermoplastic tubes of limited length but having wall thicknesses within very close tolerances.

A further object of this invention is to provide a method of making plastic shot shell tubes that is less expensive than prior methods of making shot shells.

Yet another object of this invention is to provide an improved method of making plastic shot shell cases in which the strength gained by stretching the plastic may be of maximum amount.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is a vertical sectional view of the original plastic molding from which the shot shell case is made;

FIGURE 2 is the same piece after it has been put through the draw dies; it is drawn to the same scale as FIGURE 1;

FIGURE 3 is the same structure shown in FIGURE 2 after the piece has been trimmed and grooved ready for assembling to the head of the shot shell;

FIGURE 4 is a vertical section through a completed shot shell case drawn to the same scale as FIGURES 1, 2 and 3;

FIGURE 5 is a shot shell case head in its first formation prior to being assembled to the shot shell case; it is drawn to the same scales as FIGURES 1, 2, 3 and 4;

FIGURE 6 is an enlarged, diagrammatic, vertical section through a completed shot shell;

FIGURE 7 is a horizontal section taken on the line 7—7 of FIGURE 4 and drawn to the same scale as that figure;

FIGURE 8 is a side elevation of the male draw die together with a vertical section of the basic plug shown in FIGURE 1, and the female draw die ready to begin the drawing operation; broken lines illustrate hidden parts;

FIGURE 9 is a view similar to FIGURE 8 after the male draw die has been forced through the female draw die, thus forming the structure shown in FIGURE 2 and before the stripper has taken the plastic shot shell case off the male die; broken lines again illustrate hidden parts;

FIGURE 10 is a modified form of cup drawn to the scale used in FIGURE 1;

FIGURE 11 is a vertical section through a modified form of shell tube formed from the cup shown in FIGURE 10 drawn to the same scale;

FIGURE 12 is an enlarged vertical section through a shell such as that shown in FIGURE 11 with the wad and shot pouch shown in FIGURE 14 installed; FIGURE 12 is drawn to the same scale as FIGURE 6;

FIGURE 13 is a top view of the structure as it appears in FIGURE 12 and drawn to the same scale as that figure;

FIGURE 14 is an exploded perspective view of the separable wad and shot pouch; FIGURE 14 is drawn to the scale of FIGURE 12;

Figure 15:
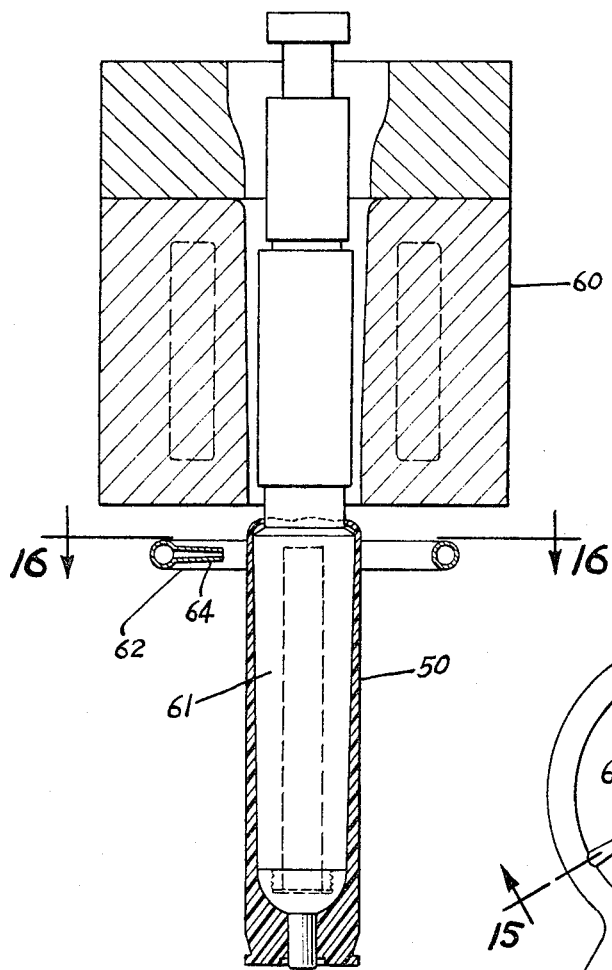
FIGURE 15 is a view similar to FIGURE 9 and drawn to the same scale but showing a modification of structure illustrated in FIGURE 9, being taken generally on the line 15—15 of FIGURE 16.
Figure 16:
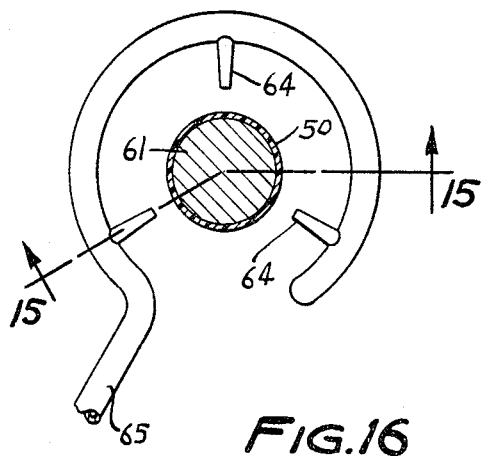
FIGURE 16 is a horizontal section taken on the line and in the direction of the arrows 16—16 of FIGURE 15 and drawn to the same scale as that figure.

In FIGURE 1, the original piece of molded plastic that will become the base wad and shell tube is shown at 10. This blank may be made in any suitable manner as by injection molding, for example, and the material used in any suitable thermoplastic material of which high density polyethylene (having a density on the order of 0.942 to 0.965), polypropylene, related polyolefins, being examples. These materials and a thermoplastic sold by Eastman Chemical Corporation under the trademark "Pollyamer," the generic description of which is not presently known, may be formed, preferably molding or cutting into discs that are formed into cups or molded directly into cups and then further formed into the shot shell case. The blank 10 is provided with a well 11 and an opening at the bottom 12. The well 11 receives the male draw tool or punch while the opening 12 aids in stabilizing the cup on the punch and, in the finished shell case, receives the priming device or cap.

In FIGURE 2, the blank 10 is shown as having been drawn by being passed through the draw dies and thereby having formed therein the finished opening 12 for receiving the priming cup and the base wad portion 14 which will resist pressures generated by the powder as it drives the charge out of the shot shell case.

The walls 15 of the tube will be seen to be tapered toward the mouth of the tube. The principal reasons for doing this are to increase biaxial orientation near the mouth of the tube, thin the wall for crimping and incidentally to provide a form of tube that can be removed easily from the male draw die. At any given elevation of the tube, however, the wall thicknesses are exactly the same all around the tube that will eventually receive the power and shot.

In FIGURE 3, the tube 10 has been trimmed at the upper end 16 to appropriate length and a groove 17 formed therein which provides an exceptionally secure means for fastening the metal head to the plastic tube.

In FIGURE 5 is seen the head 18 partially formed and ready to be placed on the shot shell tube 10. The partially formed rim 19 is already set at this stage of the operation and when the head 18 is engaged with the base of the shot shell tube 10, the rim 19 is crimped down into its final form as seen in FIGURE 4. The portion of the metal as at 20 is also rolled into the notch 17 thereby securely attaching the metal head to the butt end of the shot shell tube. Head 18 also has an opening 21 in its bottom which aligns with the opening 12 in the shot shell tube in order to receive the priming device 22. FIGURE 4, therefore, illustrates a completed shot shell ready to be loaded.

The loaded shell is illustrated in FIGURE 6 where the powder charge is merely designated by the area 24, a suitable cushion wad such as that disclosed in U.S. Patent 2,759,852, by area 25 and the space reserved for shot 26. Any suitable top wad 27 such as the one made by the method disclosed in U.S. Patent 2,599,943 closes the end of the tube and the tube is crimped as at 28 in the traditional manner to hold top wad 27 in place. The mouth of the tube may also be appropriately closed by the folded or wadless method in which the mouth of the tube is closed entirely by a portion of the tube itself as shown in FIGURES 10–13.

The base wad portion 14 in this shell may be on the order of only .188 inch thick from the inside bottom of the metal cap to the inside of the tube adjacent to the primer device. Nevertheless, because base wad portion 14 is formed integrally with the side walls of the shell, there was no head distorting gas leakage when these shells are fired. The length of conventional base wads that would be used in a shell for which a base wad of .188 inch is provided in the shell disclosed, would range from .281 up to .625 inch. Not only is this integral base wad more efficient in sealing the gases within the shot shell tube, therefore, it also provides from 1/10 to 1/2 inch more space within the shot shell tube for the placement of powder charge and other loading materials.

The method of forming these integral base wad and tube shot shells is best understood from a consideration of FIGURES 8 and 9. The method may be carried out at either room temperature, hereafter called cold, or at elevated temperatures or hot drawn.

In the latter method, the original thermoplastic molding or cup 10 is first heated to a maximum temperature without destroying crystallization. This is the temperature at which the material is most easily stretched in two directions to provide the molecular alignment that imparts the greatest tensile strength. These temperatures for the various thermoplastics that might be employed herein are well known and hence not set out here. When the material used is a high density polyethylene (also known as linear, straight-chain or low pressure polyethylene and having a density of 0.942 to 0.965) of a type such as that sold by Hercules Powder Company under the trademark "HI-FAX" and specifically the 1800 type, this temperature is known to be 124° C. to 125° C. The Eastman Chemical material "Pollyallamer" has about the same requirements. The process will be described using this material as an example, it being understood that other materials could be substituted and altered temperatures, etc. may be used as required. Heating cup 10 prior to forcing the male draw tool 29 into it may be by any suitable means as by passing it through a warm air heating oven. The electrical heating element 30 in the male draw tool aids in maintaining this temperature. As the cup is substantially smaller on the inside than the male draw tool or punch 29, the cup is expanded in a radial direction a considerable amount when the punch is forced into it.

After the male draw tool 29 has been forced into cup 10, the male draw tool is forced through the female draw die 32 by any suitable means such as the hydraulic press or the like. The male draw tool is provided as at 34 in FIGURES 8 and 9 with suitable means for attaching it to a press. Guide block 35 positioned above the female draw tool 32 guides the cup 10 carried on the male draw tool down into the tapered portion 36 of the female draw die. The female draw die is also heated in some suitable manner as by the heating coils 37. The draw tools are therefore maintained also at the proper temperature for the particular thermoplastic being used.

As the male draw die is forced through the female draw die, the walls of cup 10 which are too thick to pass through the female draw tool or die when stretched over the punch, are elongated along the punch until the upper end 38 of the plastic material enters the stripper groove 39 on the male draw tool 29. This is seen in FIGURE 9 where the punch has been forced entirely through the draw die leaving clearance for a conventional stripper to engage the punch.

With the stripper engaged, the male draw tool is withdrawn through the female draw tool and the drawn shot shell tube is stripped off the punch by the stripper. The male draw tool is tapered slightly which produces the tapered walls of the tube 10. The principal reasons for tapering the male draw die is to provide maximum biaxial orientation at the mouth of the shell and to facilitate stripping the drawn shells therefrom. As shown in FIGURE 9, the structure produced is approximately that of FIGURE 2. The shell has actually been drawn somewhat longer than is necessary to make the finished shot shell tube so that its end which may be and usually is somewhat irregular as shown by the broken line 40 in FIGURE 9, may be trimmed off evenly.

The trimming and grooving of the drawn shot shell shown in FIGURES 9 and 2 is accomplished by suitable means not here shown nor described in detail as not per se inventive herein. The scrap material from this trimming and grooving process may be mixed in limited quantities with fresh material and used to produce additional shot shell tubes.

In our earlier copending disclosure, we indicated the necessity to heat the thermoplastic to a maximum temperature of crystallization as described above. We have since discovered that the same drawing technique as disclosed in that prior application can be carried out at room temperatures. The drawback to using materials at room temperatures is that greater force is required to push the material through the dies and that somewhat greater tendency for the sides of the material to be scored or disfigured is experienced. Also the orientation and hence the strength achieved is not as great although sufficient to create a usable structure. It would also appear that the bearing supports for the dies to hold them precisely aligned when cold drawing in order to produce tapering tubes having consistent wall thickness at any given cross-sectional point along their lengths will be in excess of that required when using heated dies. It has been found that there is some variation in wall thickness when the die structures designed for hot drawing were used with cold material. The slight variation in wall thickness that occurs in this situation is believed to be caused by the lateral displacement of the male die in relation to the female die as the cup is being forced through the latter when the former is not sufficiently supported.

Cold forming has some considerable advantages, however, not the least of which is being able to operate the machine without being concerned about die temperature except to lubricate the dies to make sure that the friction heating of the dies is kept within bounds. This is even more necessary in the hot draw process which requires a lubricating solution to be used also and which complicates maintaining correct temperatures. The premolded cups are more easily handled when cold, and interruption of production does not result in loss of cup heat which is a substantial problem when using the hot draw process. When hot drawing, stopping the press requires removing cups in the mechanism, washing off the lubrication and reheating the cups. Furthermore the savings in not preheating the cups appears to at least offset the added power needed to cold draw.

As shown in FIGURES 10 and 11, the rimless shot shell made of plastic is formed in substantially the same pattern as a rimless metallic cartridge is formed. The unit is manufactured from a premolded plug 50, in FIGURE 10, of a type similar to that illustrated in FIGURES 1 through 6 but having substantially more material in the base wad portion 51 in order to provide material to allow for the formation of groove 52. This groove is formed in the usual shape of a rimless automatic weapon cartridge case with the leading edge slanting at an angle of approximately 15 degrees to the vertical and the rear surface of the groove designated 51R being substantially normal to the length of the case in order to receive the ejector mechanism. All of the more recent rifle cartridges are of the so-called rimless type for the reason that they function better in automatic and semi-automatic weapons.

The construction shown in FIGURES 10-14 also is distinct from the form shown in FIGURES 1-9 in that the top of the tube designated 50t which is used to enclose the shot in the tube is made substantially thinner than the tube illustrated in the previously disclosed form of the device. While it cannot be shown accurately in drawings of the character used for patent applications, the wall thickness at 16 in FIGURE 3 is .0225 plus or minus .001 of an inch; the thickness of the wall at 50t is from .0125 to .0150.

It is feasible to make the end of the structure shown in FIGURES 10-14 with the upper part of the tube as thin as stated by the use of what are now known as shot pouches. The particular structure shown herein comprises the concave faced wad 54 similar to that shown in U.S. Patent No. 157,793 but which in each end has a supporting central column 55. A shot pouch arrangement 57 comprises a cylinder open at one end and closed at the other with vertical slits as shown at 58 dividing the upper part of the cylinder into two or more segments. The bottom of pouch 57 rests on the top of column 55 and on the edge 59 of wad 54 facing the shot pouch. This arrangement of parts may be clearly seen in the sectional view of FIGURE 12. It will be noted that the over-the powder wad 54 has a column such as the one designated 55 in FIGURE 14 in both ends, the lower one being 56 in FIGURE 12, and that the opposite faces of the entire structure are, therefore, symmetrical. The purpose of this is simply to permit the wads to be assembled in either direction into the shell case 50. The column 56 in FIGURE 12 is superfluous but harmless. The usual primer cup is designated 60.

We have also discovered since our first disclosure, particularly when using the hot draw process, we can obtain stronger end products if a cooling solution is sprayed on to the tubes as they eject from die structure. As shown in FIGURE 15, the female die may be substantially identical to a separate number 60 to distinguish it clearly from the previously illustrated structures. The male die 61, however, is made with a slightly greater diameter at the top end so that case 50 is drawn more thinly at the top as discussed above.

Any suitable structure such as the hollow pipe C-ring 62 embraces the opening in female die 60 from which the shot case 50 and male die 61 protrude as the draw is completed. A plurality of nozzles such as seen at 64 communicate with the interior of the hollow C-ring 62. A cooling solution may be pumped in from any suitable pump via the connecting pipe 65, and cooling solution sprays on to the shot shell case from three directions giving substantially complete coverage. It has been discovered that the strength provided by biaxial orientation is maintained at a higher level when the case is immediately cooled upon emerging from the female die 60 and particularly at the hot draw process.

While the method imparting both radial and longitudinal stretching to plastic tubing having one end at least partially closed has been described as used in making shot shells, it is obvious that any application that might be made of plastic tubes requiring greater strength is achieved by injection molding and of limited length could use the process described herein. This method of making tubes or cups of limited length but extremely consistent wall thickness might also be applied to any thermoplastic whether or not such treatment increased its strength, providing the material remained strong enough to achieve its intended function after being drawn.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A method of making an oriented plastic shot shell hull tube comprising: providing a cup shaped tubular blank of linear polyolefin plastic having an open end and a substantially closed end for forming an integral base wad, passing a tapered male die into the open end of said blank to radially stretch said blank to produce circumferential orientation in said plastic, said male die stretching said blank to an inner diameter less than the original outer diameter of said blank, and passing said blank and male die through a female die to longitudinally stretch said blank to produce longitudinal orientation in said plastic, said male and female dies longitudinally stretching said blank to a uniform outer diameter along its entire length and to an inner diameter tapering outwardly toward the open end of said blank whereby the orientation of said plastic is increased at said open end.

2. A method of making an oriented plastic shot shell hull tube comprising: providing a cup shaped tubular blank of high density polyethylene plastic having an open end and a substantially closed end for forming an integral base wad, heating said blank, passing a tapered male die into the open end of said blank to radially stretch said blank to produce circumferential orientation in said plastic, said male die stretching said blank to an inner diameter less than the original outer diameter of said blank, and passing said blank and male die through a female die to longitudinally stetch said blank to produce longitudinal orientation in said plastic, said male and female dies longitudinally stretching said blank to a uniform outer diameter along its entire length and to an inner diameter tapering outwardly toward the open end of said blank whereby the orientation of said plastic is increased at said open end.

3. A method of making an oriented plastic shot shell hull tube comprising: providing a cup shaped tubular blank of polyethylene plastic with a density of 0.942 to 0.965 having an open end and a substantially closed end for forming an integral base wad, heating said blank to its maximum temperature of crystallization, passing a tapered male die into the open end of said blank to radially stretch said blank to produce circumferential orientation in said plastic, said male die stretching said blank to an inner diameter less than the original outer diameter of said blank, and passing said blank and male die through a female die to longitudinally stretch said blank to produce longitudinal orientation in said plastic, said male and female dies longitudinally stretching said blank to a uniform outer diameter along its entire length and to an inner diameter tapering outwardly toward the open end of said blank whereby the orientation of said plastic is increased at said open end.

4. A method according to claim 3 wherein said blank is heated to a temperature of from 124° to 125° C.

References Cited by the Examiner

UNITED STATES PATENTS

| 202,363 | 4/1878 | Moore | 205—7 |
| 1,503,023 | 7/1924 | Carlson | 205—7 |
| 1,919,918 | 7/1933 | Whitehouse | 264—323 |
| 2,194,313 | 3/1940 | Loomis | 264—323 |
| 2,249,004 | 7/1941 | Kahn et al. | 264—323 |
| 2,249,775 | 7/1941 | Millispaugh | 205—7 |
| 2,987,798 | 6/1961 | Fromont | 29—1.31 |
| 3,074,115 | 1/1963 | Albrecht et al. | 264—323 XR |
| 3,103,170 | 9/1963 | Covington et al. | 264—323 XR |

FOREIGN PATENTS

| 1,182,969 | 1/1959 | France. |
| 1,193,324 | 4/1959 | France. |

OTHER REFERENCES

Plastics Engineering Handbook, The Society of Plastics Industry, Inc., Reinhold Publishing Corp., New York, 1954.

ROBERT F. WHITE, *Primary Examiner.*

M. R. DOWLING, *Assistant Examiner.*

UNITED STATES PATENT OFFICE
CERTIFICATE OF CORRECTION

Patent No. 3,284,560                                        November 8, 1966

William N. King et al.

It is hereby certified that error appears in the above numbered patent requiring correction and that the said Letters Patent should read as corrected below.

Column 3, line 36, for "in" read -- is --; column 5, line 17, for "thereform" read -- therefrom --; column 6, line 49, after "to", first occurrence, insert -- that shown earlier but the female die of FIGURE 15 is here given --; column 7, line 37, for "stetch" read -- stretch --.

Signed and sealed this 5th day of September 1967.

(SEAL)
Attest:

ERNEST W. SWIDER                                        EDWARD J. BRENNER
Attesting Officer                                              Commissioner of Patents